(12) United States Patent
Williams (10) Patent No.: US 8,015,568 B2
(45) Date of Patent: *Sep. 6, 2011

(54) DISK DRIVE/CPU ARCHITECTURE FOR DISTRIBUTED COMPUTING

(75) Inventor: Larry Lynn Williams, Los Altos, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 1865 days.

This patent is subject to a terminal disclaimer.

(21) Appl. No.: 11/069,331

(22) Filed: Feb. 28, 2005

(65) Prior Publication Data

US 2006/0195842 A1    Aug. 31, 2006

(51) Int. Cl.
  G06F 9/46    (2006.01)
  G06F 13/00   (2006.01)
  G06F 11/00   (2006.01)

(52) U.S. Cl. ........ 718/108; 718/102; 718/104; 711/100; 711/111; 711/112; 714/42; 714/6.11; 714/25; 712/227; 712/228

(58) Field of Classification Search .................. 380/202, 380/259; 713/165, 175; 711/112; 717/121; 718/100, 103, 104
See application file for complete search history.

(56) References Cited

U.S. PATENT DOCUMENTS

| | | | | |
|---|---|---|---|---|
| 4,103,338 A * | 7/1978 | Cizmic et al. | .................... | 714/42 |
| 4,777,591 A * | 10/1988 | Chang et al. | .................... | 712/40 |
| 5,615,335 A * | 3/1997 | Onffroy et al. | .................. | 714/30 |
| 5,659,801 A * | 8/1997 | Kopsaftis | ........................ | 710/62 |
| 5,805,891 A * | 9/1998 | Bizuneh et al. | ............... | 717/121 |
| 5,991,806 A * | 11/1999 | McHann, Jr. | ................. | 709/224 |
| 6,078,990 A * | 6/2000 | Frazier | .......................... | 711/114 |
| 6,169,413 B1 * | 1/2001 | Paek et al. | ..................... | 324/760 |
| 6,223,308 B1 * | 4/2001 | Estakhri et al. | ................. | 714/42 |
| 6,285,999 B1 | 9/2001 | Page | | |
| 6,421,779 B1 * | 7/2002 | Kuroda et al. | ................ | 713/169 |
| 6,467,054 B1 * | 10/2002 | Lenny | ............................. | 714/42 |
| 6,594,698 B1 * | 7/2003 | Chow et al. | ..................... | 709/226 |
| 6,600,614 B2 * | 7/2003 | Lenny et al. | ...................... | 360/31 |
| 6,799,176 B1 | 9/2004 | Page | | |
| 6,809,893 B2 * | 10/2004 | Uzumaki et al. | ................ | 360/31 |
| 7,047,450 B2 * | 5/2006 | Iwamitsu et al. | ............... | 714/43 |
| 7,181,458 B1 * | 2/2007 | Higashi | ........................ | 707/695 |
| 7,197,634 B2 * | 3/2007 | Kruger et al. | ..................... | 713/1 |
| 7,206,970 B1 * | 4/2007 | Lauterbach et al. | ............ | 714/36 |
| 7,240,188 B2 * | 7/2007 | Takata et al. | ...................... | 713/1 |
| 2002/0103943 A1 * | 8/2002 | Lo et al. | ........................... | 710/2 |
| 2002/0162075 A1 | 10/2002 | Talagala et al. | | |
| 2003/0051097 A1 * | 3/2003 | Ottesen et al. | ................ | 711/112 |
| 2003/0227703 A1 | 12/2003 | Hinshaw | | |
| 2004/0172538 A1 * | 9/2004 | Satoh et al. | .................. | 713/175 |
| 2004/0228533 A1 | 11/2004 | Adelmann | | |
| 2004/0243745 A1 | 12/2004 | Bolt et al. | | |
| 2005/0180267 A1 * | 8/2005 | Jeong et al. | ..................... | 368/96 |

* cited by examiner

*Primary Examiner* — Meng A An
*Assistant Examiner* — Abdullah Al Kawsar
(74) *Attorney, Agent, or Firm* — G. Marlin Knight (57) ABSTRACT

A disk drive is described which executes distributed computing tasks including a CPU and associated memory. The communication interface with the host computer is modified to allow the host computer to send executable code for a task to the drive and to allow the drive to communicate the results and status information about the task to the host computer. In a preferred embodiment the disk drive has a task control program, task program code, task data and status information for the distributed task. In alternative embodiments, the disk drive can communicate with other similar disk drives in the bus to provide the results of computation to the other processors. The RAM memory, and mass storage are intimately connected through the associated hard disk controller such that the exact location of the required data and program instructions are known.

8 Claims, 5 Drawing Sheets

DISK DRIVE/CPU ARCHITECTURE FOR DISTRIBUTED COMPUTING

FIELD OF THE INVENTION

The invention relates to data storage devices such as disk drives with, the architecture of the communication interface between the data storage devices and host computer and more particularly to methods and means for executing programs on the data storage device to implement distributed computing processes.

BACKGROUND OF THE INVENTION

Commercially available disk drives cannot perform any operation on the data other than those directly related to its storage, for example, performing error correction computations. There have been some suggestions for enhancing disk drives (HDD) by adding an application-specific component for receiving and executing application-specific instructions. Published US patent application 20030227703 by F. D. Hinshaw, describes application-specific components which can perform application-specific tasks, such as database operations, using data on the HDDs and return results to a local host or even a remote host via a network. Examples of the application-specific component include a circuit board or an integrated circuit such as an Application Specific Integrated Circuit (ASIC), Field Programmable Gate Array (FPGA), Central Processing Unit (CPU), or Digital Signal Processor (DSP). The additional component is capable of receiving application-specific instructions via a standard network connection and executing these application-specific instructions on the data contained on the disks. The application-specific component may be in the form of an add-on board which couples to the controller circuit or, alternatively, in the form of an application-specific chip which mates with a socket provided on the controller circuit.

In US patent application 20020162075 by Talagala, et al. a storage system is described which includes a storage array controller and a storage array. The storage array controller issues scrubbing operation commands to one or more of the disk drive controllers. In response, each disk drive controller that receives a scrubbing operation command reads data from within a data range from at least one of the disk drives, calculates a new checksum for the data, and compares the new checksum to a preexisting checksum for the data. If the new checksum doesn't equal the preexisting checksum, the data within the data range is determined to be erroneous.

Prior art data storage devices such as disk drives have drive control systems include means for accepting commands from a host computer including commands related to self-testing, calibration and power management. Each drive has programming code (microcode) in nonvolatile memory for execution by a controller, which is a special purpose processor, to enable it to perform essential functions. The microcode can be updated through the drive's communication interface as described, for example, in U.S. Pat. No. 5,659,801 to Kopsaftis. Various standard communication interfaces with both hardware components and command protocols are commonly used such as IDE, SCSI, Serial ATA, and Fibre Channel Arbitrated Loop (FC-AL).

This invention described herein is concerned with the implementation of distributed computing processes using a new disk file architecture such that distributed processing can be applied to tasks on a much broader scale than has previously been available. In general, distributed processing includes parallel processing as a special case of the simultaneous use of multiple computers resources to solve a computational problem. The resources can range from a single "computer" with multiple processors to an arbitrary number of computers connected to a network, or some combination of those. Parallel computing is advantageous to those tasks that can be broken apart into discrete tasks that can be solved simultaneously. Such systems with more than one computer can execute multiple programs at the same moment, and reach a result faster than would be possible with a single computer resource. Currently parallel computing has been applied to very large problems such as planetary orbits, weather prediction, ocean current patterns, tectonic plate drift, chemical and nuclear reactions, biological prediction such as the human genome activity and the such which can only be solved with very large (and very expensive) parallel computers. As the cost of parallel computing comes down, less spectacular problems can also be solved faster and cheaper with parallel processing systems. These applications include rush hour traffic, assembly line control, daily business operations, mechanical simulation such as bending of complex plates and thermal distribution, complex circuit simulation, parallel databases, data mining, oil exploration, web search engines, computer-aided medical diagnosis, advanced graphics and virtual reality, networked video, and the like.

The fundamental reason for utilizing distributed and parallel computing is to solve problems faster and cheaper. Some applications must be done in real time (such as missile defense and guidance systems), other tasks are so complex that the only practical solution is parallel computing. Included in these applications are high-speed wide area network applications where speed is the principal objective. Some applications have non-local resources such as wide area weather forecasting where only parallel computing is the practical solution. Of course, many of these applications can be done, given sufficient time, with a single, expensive supercomputer. But utilizing multiple slower (and cheaper) systems is a much more economical solution. Since communication speed is limited by the speed of light, super computers are forced to move their components closer and closer together to achieve higher speeds. Not only are there limitations to the affordable miniaturization, the impact on cooling and electrical interference are difficult to overcome.

One of the oldest of the computing models was proposed by John Von Neumann. In this model, the Central Process Unit (CPU) fetches data from memory, makes computations on that data, and stores the data back in memory. Both the program and the data are generally stored in the memory, which can either be RAM or some random access storage device such as a disk drive. The main point here is that the CPU fetches data sequentially from the memory, performs operations as required, and sequentially stores the results back in memory. In the "taxonomy" of computer systems, this is termed a "single instruction, single data" processing system.

At least three more architectures can be conceived: "single instruction, multiple data" systems, "multiple instruction, single data" systems, and finally "multiple instruction, multiple data" systems. In "single instruction, multiple data" architecture, a multiplicity of computers execute the same instruction at a particular time. For example, in a weather processing system where the current weather prediction is contained in multiple computers, the time must be updated at the same time on all computers so that further predictions are always utilizing the current prediction at the same time rather than contaminating a prediction by utilizing data for different times. Task of this sort are generally termed "vector pipelines" in the literature, e.g. each computer performs the same process on one element of a "vector" of tasks.

In the next architecture, multiple-instruction single-data, a multiplicity of processors performs computations on the same data. One could conceive of such an application investigating a probabilistic task where each processor is computing the probably of a series of events, each with slightly different assumptions on the probabilistic state of the starting data. For example, one could conceive of a Markov chain where the starting condition is known, but where only a range of probabilities is know for the transitions between the states of the process. With the application of a parallel computer system, each computer would follow a slightly different chain depending upon the slightly different assumptions probably between states. At the end of several state changes, the each computer in the parallel system would have a solution that, when taken in aggregate, would describe the most likely outcome and the probability of each particular outcome. This could easily be a real-time application such as selection, aiming, and firing of a missile array. Another potential application is determining the most likely location to investigate for oil in an oil exploration task where one starts with the same data but different assumptions.

The last application of parallel processing in this taxonomy is multiple-instruction, multiple-data systems. Each processor may be executing a different instruction stream and may be executing a different instruction team. Currently, most super computers and networked parallel computers use this architecture. An example of this application is the computation of the temperature distribution in a complex machine. The physical machine can be conceptually subdivided in into a multiplicity of small nearly infinitesimal cubes in which the boundary conditions in each cube are initially known. The physical characteristics of the cubes may differ; some contain air (and the movement of the air in the cube), others may contain metal or plastic parts in which the contents do not change appreciably, but where the thermal characteristics are quite different that those cubes containing a gas or a fluid. Once the initial conditions are known, the predicted conditions at the next increment of time can be computed, and the boundary conditions of each cube are computed. At this point the boundary conditions on the interface between two small cubes may be different. Suppose, for example, the boundary between cube C1 and C2 is B1 and the initial temperature of the boundary B1 is T1. Based on all of the boundaries of B1, a new temperature at B1 is established. At the same time, a the conditions in C2 result is a new temperature at B1 which, in the general case, is not the same as that found by solving the boundary problem in B1. A simple algorithm is to average the two predicted conditions at either side of B1. Once this is completed for all the interfaces of all the cubes in the problem, the task is restarted. This continues until the temperature at B1 reaches a stable value. This same process is repeated for all six boundaries of each of the cubes that describe the complex machine. Once a stable condition is arrived at, the process restarts for the next increment of time.

In an architecture that describes the preceding taxonomy a set of computers, with their associated memories, is connected through some network. In the multiple-instruction, single-data taxonomy, only one computer would have an associated memory, and possibly that computer would only be used only to communicate with the other computers. In the multiple-instruction, multiple-data system, each computer would process the data in it's associated memory (possibly using the instructions in it's memory) and communicate the results of those computations over the network to other computers the array.

In a few applications, high-speed volatile memory (such as RAM) is sufficient for the task. But in most complex applications a mass storage system (such as a disk drive or similar technology) is required. Each processor in the array has not only the associated RAM memory, but also an associated mass storage. The interface between the CPU and the mass storage can be any of the large set of computer interfaces such as SCSI, an IDE, of fiber channel. Now the array can process a large problem, but the addition of the mass storage also contributes to overhead, the know limitation of parallel processing.

In an early work (1967), Amdahl has shown that the principal limitation to a parallel processing system is overhead. This overhead is so significant that the maximum number of effective parallel processors can be less than a dozen. In addition, the time required to store and retrieve data from mass storage such as a disk drive is a real world factor. Most of the computational time (the so called "observed speed up time") is taken by fetching instructions and data from the mass storage. In the case of a SCSI interface, the CPU sends a virtual command through the interface to the storage unit to fetch a particular block of data, the disk drive interprets the command, inserts the command in it's associated stack if it is processing other requests, and when the command finally reaches the top of the stack, the disk drive positions the head over the appropriate physical address on the disk and reads the requested data into it's buffer. Once the buffer is full, the data is sent back to the CPU through the interface. This process continues until the request is complete and the disk drive then executes the next request in the stack.

Many have voiced the contention that the organization of a single computer has reached its limits and that truly significant advances can be made only by interconnection of a multiplicity of computers in such a manner as to permit cooperative solution. The nature of this overhead (in parallelism) appears to be sequential so that it is unlikely to be amenable to parallel processing techniques. Overhead alone would then place an upper limit on throughput as a small multiple of the sequential processing rate, even if the housekeeping were done in a separate processor. So the fundamental limitation on a parallel computing system is not the speed of the actual computations but the overhead.

SUMMARY OF THE INVENTION

A disk drive is described which includes means for executing distributed computing tasks including a CPU and associated memory. The communication interface with the host computer is modified to allow the host computer to send executable code for a task to the drive and to allow the drive to communicate the results and status information about the task to the host computer. In a preferred embodiment the disk drive has a task control program, task program code, task data and status information for the distributed task. The task control program implements the basic task management functions of storing the task program, reporting results and saving progress information to allow the task to be interrupted by other drive functions. In alternative embodiments, the disk drive can communicate with other similar disk drives in the bus to provide the results of computation to the other processors. The RAM memory, and mass storage are intimately connected through the associated hard disk controller such that the exact location of the required data and program instructions are known. This architecture requires fewer resources than the previous architecture because each series of instructions and set of data can be fetched immediately as required by the CPU rather than loading complete files to the CPU over the interface.

DETAILED DESCRIPTION OF THE INVENTION AND THE PREFERRED EMBODIMENTS

Figure 1:
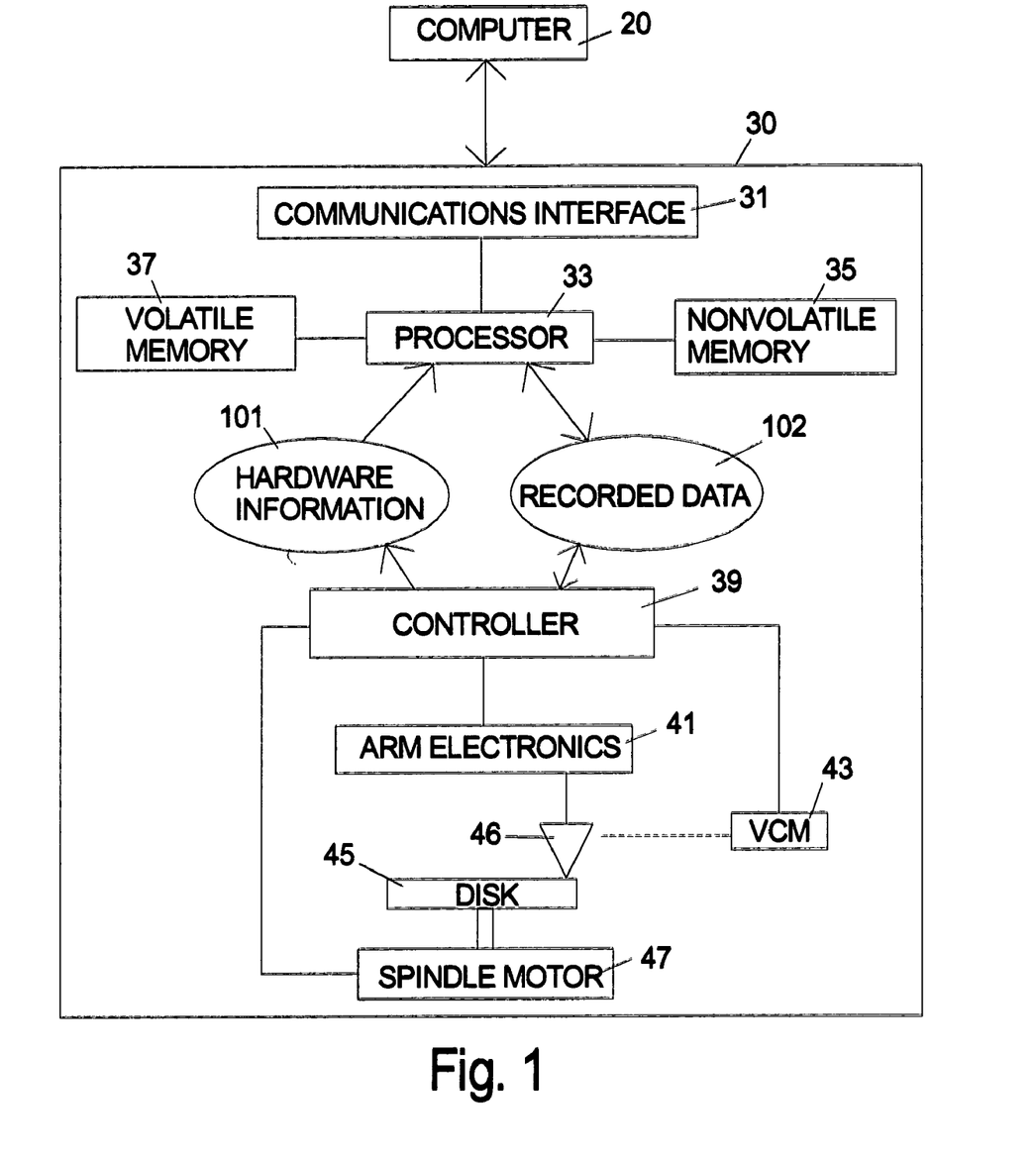
FIG. 1 is an illustration of selected components of a disk drive according to the invention.

FIG. 1 is a symbolic illustration of a disk drive 30 according to the Invention which will be called an "intelligent disk drive." Information, commands, data, etc. flow back and forth between the host computer 20 and the disk drive 30 through communications interface 31 which can be any prior art hardware interface. The disk drive includes a general purpose microprocessor 33 which accesses both volatile memory 37 and nonvolatile memory 35. The program code for the microprocessor 33 can be stored in either the volatile memory 37 or nonvolatile memory 35. The program code can originate in the nonvolatile memory 35 in the form of a preprogrammed device such as an EEprom. The program code can also originate from the host computer 20. The disk drive 30 is shown as including a separate controller 39, but in an alternative embodiment the microprocessor can be designed to handle all of the tasks normally performed by a controller and the controller can be omitted. The arm electronics 41, voice coil motor (VCM) 43, disk 45, spindle motor 47 and head 46 are according to the prior art. In each embodiment the microprocessor has access to the hardware information 101 which includes detailed information about the state of the components which can be used to optimize the execution of the special purpose tasks which are defined herein. The recorded data 102 is the standard data which is stored on and retrieved from the disk drive.

Figure 2:
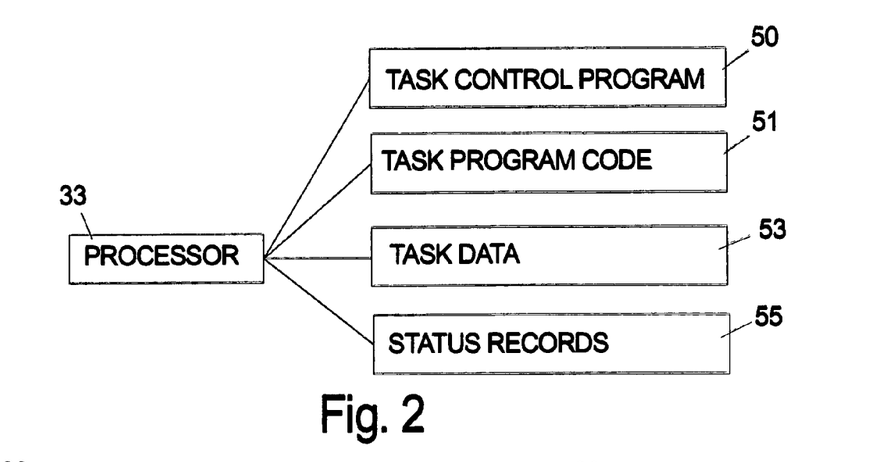
FIG. 2 is an illustration of distributed task data organization in a disk drive according to an embodiment of the invention.

The disk drive according to the invention is designed to execute distributed and/or parallel computing tasks. FIG. 2 illustrates the organization of the program and data used by the processor 33 for the task. In the embodiment described herein the disk drive has a task control program 50, task program code 51, task data 53 and status information for the distributed task 55. The task control program 50 can be loaded into memory from the disk at startup or stored in nonvolatile storage. The task control program 50 implements the basic task management functions of storing the task program, reporting results and saving progress information to allow the task to be interrupted by other drive functions. The prior art communications interfaces (IDE, SCSI, Serial ATA, Fibre Channel Arbitrated Loop (FC-AL), etc.) used between host computers and disk drives define a format through which the host can give commands and data to the disk drive. The invention can be implemented within the general framework of any of these systems with limited modifications which will be described below. One modification according to the invention provides a method for the computer to send executable code and data defining a task to the disk drive for temporary or long term storage in volatile or nonvolatile memory or on the disk. Preferably the drive executes the task in the background to use otherwise free time to perform the task.

The basic command interface of the intelligent disk drive can be implemented in a variety of ways. Entirely new commands can be defined or existing commands can be modified. One particular embodiment to illustrate the invention will be described. In the prior art SCSI environment there are sufficient prior art commands to accomplish the task. However, in the preferred embodiment the intelligent disk drive must also act as an initiator rather than a simple slave. SCSI commands will be used as an example, but similar commands can be used for other interfaces such as IDE, Fiber Channel, etc. The SCSI communication link between the host and the disk drive uses a Command Descriptor Block (CDB). When the host sends a command down the SCSI BUS, each drive reads the command, but only that drive with the specific drive address. For example, the CDB a simple WRITE(6) command includes fields for:

operation code (0Ah)
logical unit
logical block address
transfer length
control

The first Byte contains the operation code, the next three bits contain the SCSI unit (disk drive), the next byte is the length of the transfer, and the final byte contains various control information. Other commands may require more or less bytes for the command, but the structure is similar to the one shown. For a disk drive, a simple subset of the commands are:

FORMAT UNIT
LOCK UNLOCK CACHE
PRE-FETCH
READ(6)
READ(10)
READ DEFECT DATA
READ LONG
REASSIGN BLOCKS
RELEASE
RESERVE
REZERO UNIT
SEARCH DATA
SEARCH DATA EQUAL
SEARCH DATA HIGH
SEARCH DATA LOW
SEEK(6) AND SEEK(10)
SET LIMITS
START STOP UNIT
SYNCHRONIZE CACHE
VERIFY
WRITE(6)
WRITE(10)
WRITE AND VERIFY
WRITE LONG
WRITE SAME
SEND DIAGNOSTIC
RECEIVE DIAGNOSTIC

In the common usage of the SCSI standard, there is one "initiator" on the BUS and one or more slave devices. The slaves do not send instructions over the BUS unless they receive a request from the host. But the recent SCSI standard allows for multiple "initiators" on the same BUS which could be more than one host or the initiator could also be in the intelligent disk drive. In the following discussion it is assumed that the various hosts and the intelligent disk drives all have the capability to send or receive commands from any host or intelligent disk drive on the BUS.

Figure 3:
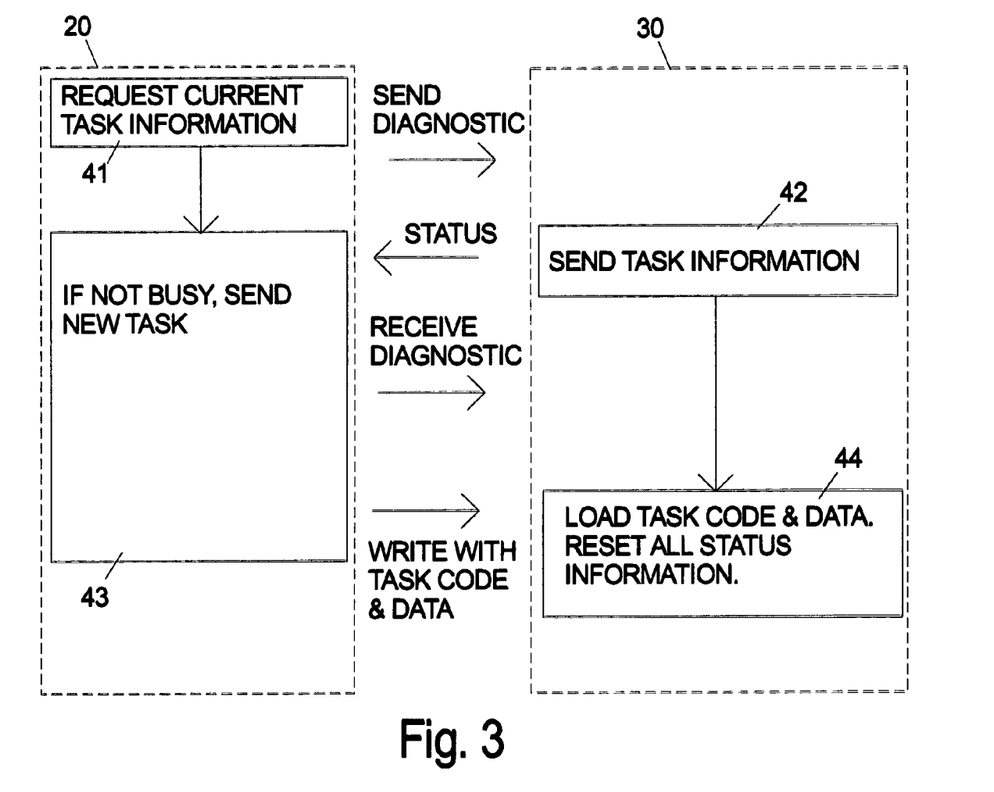
FIG. 3 is an illustration of an embodiment of the process of loading the task into a disk drive according to the invention.

The task program can conveniently be transmitted and updated through the SEND DIAGNOSTIC and RECEIVE DIAGNOSTIC commands as illustrated in FIG. 3. The host 20 can query the drive by sending a SEND DIAGNOSTIC command 41 to the disk drive. The intelligent disk drive responds by sending a block of information which includes information on the task currently defined 42. To define a new task, the host sends the intelligent disk drive a RECEIVE DIAGNOSTIC command to signal the drive to expect the task definition and then follows with a WRITE command that contains the definition of the task. The task definition can include the executable code for the task and the identity of the data. The executable code and data can be literally included in the data area of the write CDB or pointers can be used to specify data and code stored on the disk. The drive stores the task definition in the WRITE command as the new task program and initializes all of the status flags, pointers, etc. to indicate the starting point 44. In the case of multiple hosts, the intelligent disk drive optionally can accept task from only authorized hosts.

Once a distributed task is defined for the drive, the execution of the task can proceed according to the prior art multi-tasking computing techniques. The distributed task becomes one of potentially many things that the drive has to do. As known prior art, tasks are assigned a priority level to allocate the CPU resources. Preferably the distributed task is assigned a low priority so that it runs in the background without interfering with the standard disk drive functions.

Figure 4:
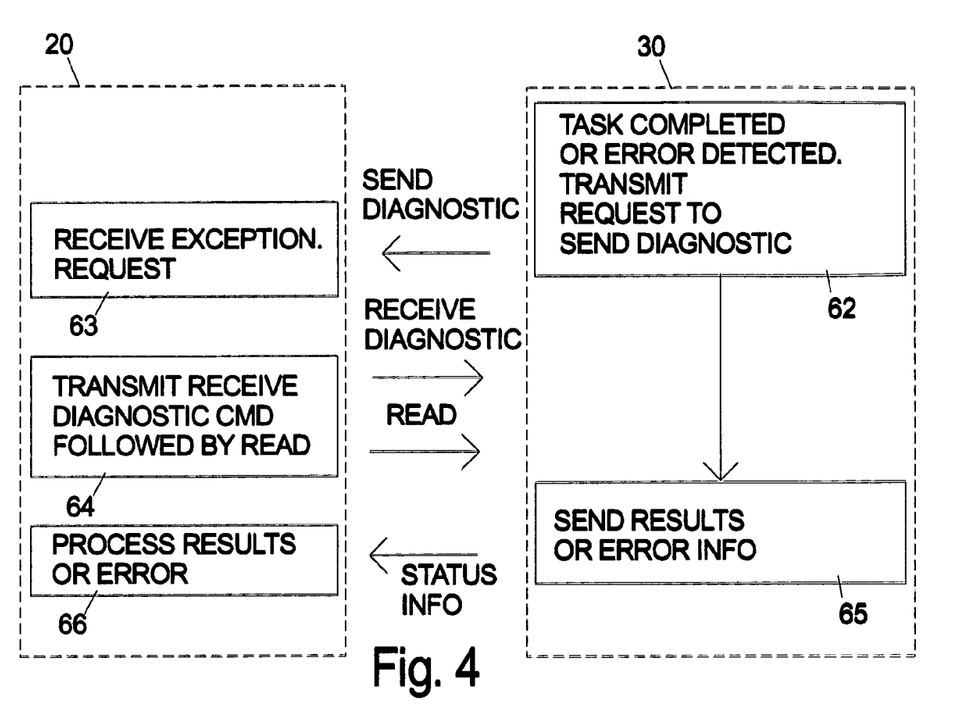
FIG. 4 is an illustration of an embodiment of the process of reporting task results from a disk drive to a host computer according to the invention.

When the disk drive needs to communicate information about the task to the host, the drive initiates a communication sequence by signaling the host (or hosts). The communication about the task could be an error message or a completion message. In one embodiment illustrated in FIG. 4 this is done by transmitting a SEND DIAGNOSTIC command 62, which is used in the prior art for error conditions, to indicate that a problem has been detected with the file the host has requested. In this embodiment the existing SEND DIAGNOSTIC protocol is modified to include means for communicating error conditions relating to the task and the results of the task. The host receives the SEND DIAGNOSTIC command as an exception 63. It continues the dialog by requesting the details by issuing a RECEIVE DIAGNOSTIC command to the intelligent disk drive followed by a READ command 64 which serves as a request for the status details and allows the drive to put relevant data in data area of the response to the read command. The intelligent disk drive interprets the sequence of commands as a command to transfer the task specific information to the host 65. Once the host has received the detailed information, it can decide upon appropriate further action such as sending a new task to the drive 66.

The communication interface is used only to communicate the results each computation to the host and optionally other processors in the array. The mass data storage, RAM memory, and task program are intimately connected such that the exact location of the required data and program instructions are known. This architecture requires fewer resources than the previous architecture because each series of instructions and set of data can be fetched immediately as required by the CPU rather than loading complete files to the CPU over the interface. For example, if a complete program, with it's associated branches requires 100 MB, but the current process only requires 1 MB of the code, only that portion of the instructions would be loaded and the remainder would remain on the mass storage until it was required. This architecture is a much faster implementation (the objective of parallel processing systems) while potentially limiting the cost. Thus a parallel processing task can be accomplished with less resources than one that has more overhead and consequently requires more processors and possible more time.

In contrast to the prior art disk drive architecture, the invention describes an architecture with a CPU and task control program inside the disk drive. Logically the CPU is positioned inside the SCSI or other interface so the hand shaking overhead necessary for communication over that interface is avoided for the actual task execution. The principal communication to the disk drive (mass storage) is only through the hard disk controller. On some applications, the hardware necessary for the CPU and the HDC may be merged.

In this implementation the CPU need only fetch the portions of the program that are currently necessary because the HDC can be programmed to keep other parts of the program available on mass storage as needed. It now has the ability to do "stream processing" in which each block of a large data stream (such as a video file) can be read, processes, and stored as the next block is being read. This architecture supports the most general parallel computing architecture described earlier, so any task that is amenable to parallel computing can be accomplished with an array of such disk drives. Even though there are several architectures for parallel computers, the architecture that contains the CPU inside the disk drive will support any one of the designs, and results in a simpler implementation that has higher speed because of the elimination of much of the overhead in a typical computer architecture. Although this architecture is advantageous in a single-instruction single-data application, it is even more advantageous in other architectures such as multiple-instruction multiple-data architectures where overhead is a significant part of the computational time.

There are many potential parallel processing applications. One is the so called atmospheric modeling which attempts to predict future weather based on current weather conditions. This effort is extremely important not only in prediction of catastrophic conditions such as tornados and hurricanes, but also determining places where the atmosphere is very unstable such as clear weather turbulence. One approach described in the literature is to subdivide the atmosphere in a region as an assembly of cubes.

Assume for this example that one intelligent disk drive in a parallel processing array is assigned to each cube of atmosphere. The SCSI interface currently limits the number of devices that can be addressed, but in principle an interface can designed to handle an unlimited number of devices. The conditions in each incremental cube are a function of the cube above, below, and to either side of the cube under consideration. In addition, we can consider one more cube in either horizontal direction. If we designate the central cube as cube (i,j), then the weather in this cube, $W_{(i,j)}$, is a function of the movement of the atmosphere at that point, radiation at that location, convection, and precipitation in that area. Based on this, each intelligent disk drive may have a simple set of repetitive instructions as shown below. Although the problem is very complex, it can be segmented into a set of simple programs in each intelligent disk drive that represent one grid point. This is an example of a single-instruction multiple-data model described earlier.

Initialize Array
    Send initial conditions to each processor
    Receive initial conditions from other grid points
    Converge solution for all points in the grid
    Transmit converged solution to all grid points
    Increment time and repeat convergence A scenario for using a set or array of intelligent disk drives to work on this type of problem will be described. A host computer controls and coordinates the execution of the overall process and assigns the tasks to the intelligent disk drive. The task code in this application can be the same for each intelligent disk drive, but the data is unique for the particular cube. As described in general for FIG. 3, the host computer preferably sends an initial inquiry in the form of a SEND DIAGNOSTIC command to a drive and then receives the status information from the drive indicating whether among other things the execution of task is in progress. If the drive is not currently processing a task, then the host prepares the drive to accept the new task definition in a subsequent write command.

Figure 5:
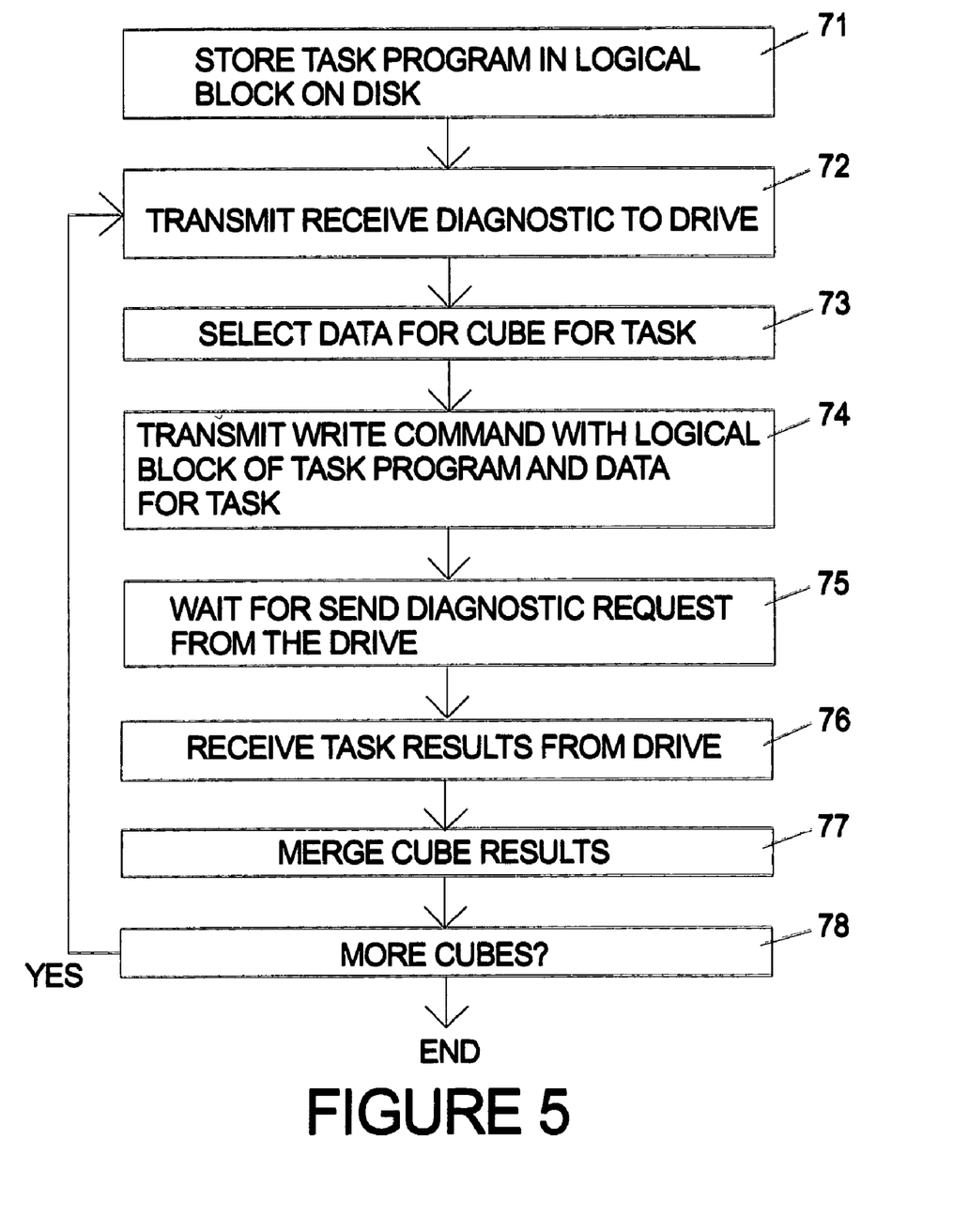
FIG. 5 is a flowchart illustrating the steps performed by a host to manage the task in the intelligent disk drive.

A flowchart illustrating the steps performed by a host to manage the task in the intelligent disk drive is given in FIG. 5. The executable code for the task can be transmitted to the drive and identified to the drive in a variety of ways. One alternative, shown in FIG. 5, is for the host to use standard write commands to write the task code to the disk 71. The host then transmits the RECEIVE DIAGNOSTIC command to the drive 72. The task data for the cube is selected 73. The write command which defines the task can then specify the logical block on the disk where the code was previously stored and sends the task data in-line 74. For a large block of code or one which is used repeatedly as in the present example, new code does not need to be sent to the drive to start each task. The host then waits for the drive to signal completion of the task with a SEND DIAGNOSTIC request 75. The results of the computations on the data are received 76 and merged with the other data from other drives 77. If more cubes are left to be processed, the host loops to the transmit step 72 to begin the process of starting the drive on a new cube.

Figure 6:
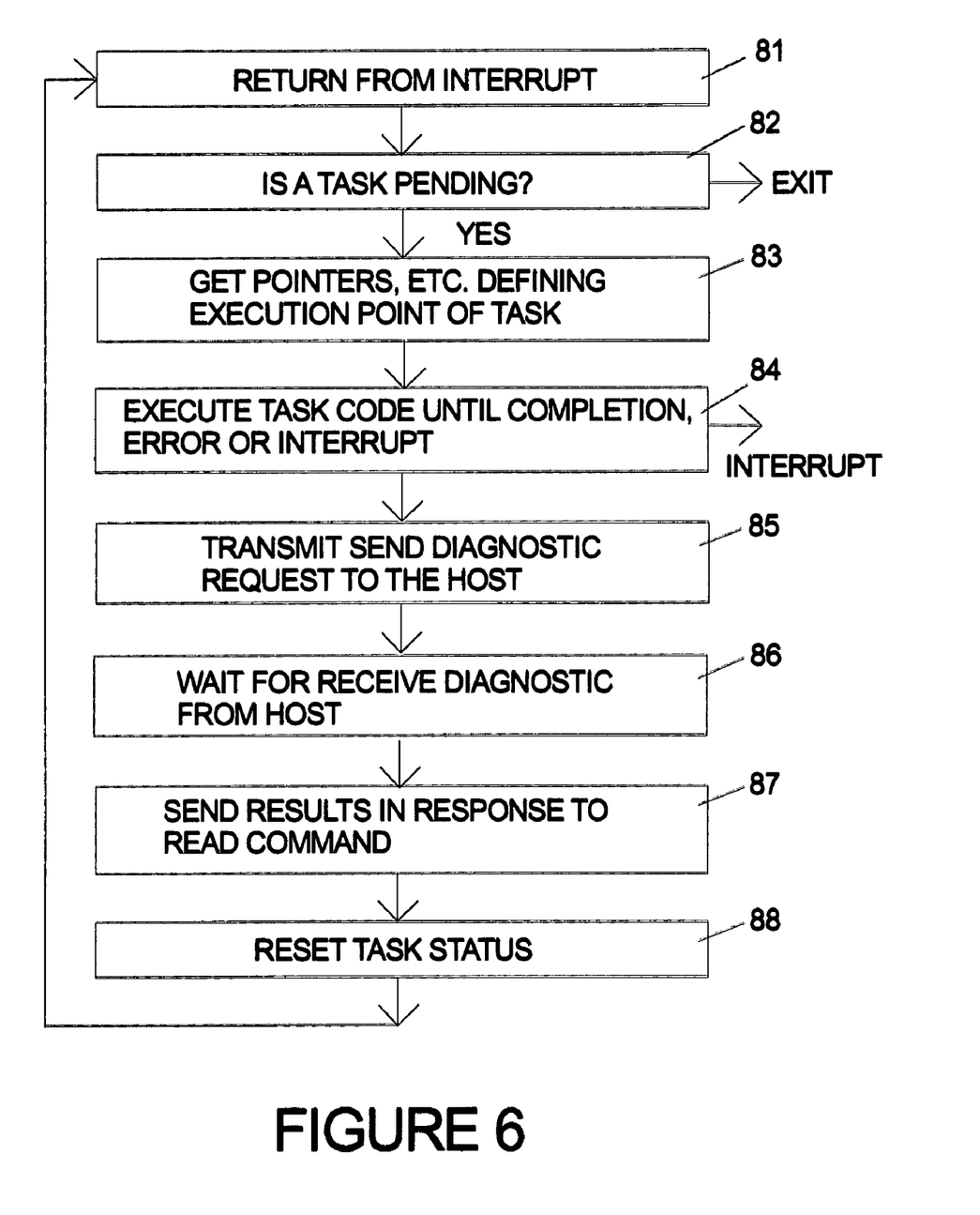
FIG. 6 is a flowchart illustrating the steps performed by an intelligent disk drive to execute a task according to the invention.

FIG. 6 is a flowchart illustrating the steps performed by an intelligent disk drive to execute a task according to the invention. The execution of various functions of the intelligent disk drive are generally interrupt driven as is the case for many systems having a plurality of real-time control and communications tasks. The definition of the task as shown in FIG. 3 is preferably interrupt driven. The execution of the distributed task is itself subject to being interrupted and upon return from an interrupt 81 the task control program preferably checks for a pending task 82. The status flags and pointers associated with the task will record whether a task is pending and sufficient information to allow the execution of the task to resume. This status information must be saved whenever a distributed task is interrupted (not shown) and it is reloaded when the task execution is resumed 83. The execution of the task continues until another interrupt occurs, an error is encountered or the task is completed 84. For an error or completion the task control program sends a SEND DIAGNOSTIC request to the host 85. The task control program waits for the host to send the RECEIVE DIAGNOSTIC command 86 and then sends the block of data for the error or completion to the host in response to the next read command 87. The task control program then resets the task status flags to indicate that no task is pending 88 and returns to normal interrupt driven processing.

The time for one rotation of the disk in current disk drives can be estimated as 4 to 10 milliseconds. Since microprocessors are available which operate on GHz clocks, times in milliseconds potentially allow time for significant processing to occur while the drive would otherwise be waiting on the mechanical components. In a preferred embodiment the execution of the task program occurs in parallel with the normal disk drive functions so that negligible delay, if any, occurs in delivering the data read from the drive.

The limitations on parallel computing system can be re-evaluated based on of the intelligent disk drive. For example, suppose there is a need to perform the computation A=B+C+D+E. In the first scenario this calculation is performed on a standard computer. The four numbers, G, C, D, and E are loaded from storage (the disk drive), the calculation is made, and the number A put back in storage. In a 15,000 RPM disk drive, the disks revolve one revolution in 4 ms., so the average latency is 2 ms. For this computation, 2 ms is need (on the average) to get B, C, D, and E (assuming there in the same logical block). This ignores the time required to move the heads over the proper track. Another 2 ms. is needed to store the data, so the net time required, assuming an infinitely fast computer is 4 ms. If this same process is performed by two computers, a simplified parallel computer array, the scenario becomes: load B and C in one computer, D and E in the second, perform two computations in each computer, send the result of the second to the first computer, add the two temporary results, and finally store the result A, the time required is still require 4 ms. Having two computers has not improved the speed of the computation because of the overhead of accessing the data on the disk drives. On the other hand if this computation is performed in an intelligent disk drive, it still might require 2 ms. to get to the start of the physical block containing B, C, D, and E, but once we have made the computation, we can store the result on the next physical block, eliminating most the second 2 milliseconds.

In a system configuration, where there are a plurality of intelligent disk drives on the same BUS the intelligent disk drive can communicate directly with other the other intelligent disk drives. Therefore, in one advanced embodiment, the means for communicating to other intelligent disk drives could be made part of the task control program or it could be included in the task code.

The invention has been described with respect to particular embodiments, but other uses and applications for the techniques according to the invention will be apparent to those skilled in the art.

The invention claimed is:

1. A disk drive comprising:
   a processor and a memory for storing data and a program for the processor;
   a task control program executable by the processor loaded into the memory, the task control program including means for accepting a task definition command from a host computer, the task definition command including a specification of a task program using a logical block identifier for previously written data comprising code executable by the processor and a specification of data for the task program;
   the processor executing the task program as an interruptible process using the data for the task program, storing task status and pointers in said memory when an interrupt occurs and resuming execution of the task program when the interrupt has been processed;
   means for signaling the host computer that the task program has completed;
   means for transmitting results of the task program to the host computer; and
   means for resetting the task status to indicate that no task program is pending after the task program has completed.

2. The disk drive of claim 1 wherein means for accepting a task definition command further comprises means for accepting the task program as data in a write command from the host which follows a diagnostic command from the host computer.

3. The disk drive of claim 1 wherein the means for signaling further comprises means for sending a request to the host computer for a diagnostic inquiry to be sent by the host computer to the disk drive.

4. The disk drive of claim 3 wherein the means for transmitting further comprises means for responding to the diagnostic inquiry by sending information on the results of the task program to the host computer.

5. A method of operating a disk drive comprising a processor and a memory for storing data and a program for the processor, the method comprising the steps of:

receiving a task definition command from a host computer in a task control program in the memory, the task definition command including a logical block identifier for previously written data as a task program that specifies code executable by the processor and a specification of data for the task program;

executing the task program by the processor as an interruptible process using the data for the task program, the executing step further comprising storing task status and pointers in said memory when an interrupt occurs and resuming execution of the task program using the stored task status and pointers when the interrupt has been processed;

signaling the host computer that the task program has completed;

transmitting results of the task program to the host computer; and resetting the task status to indicate that no task program is pending after the task program has completed.

6. The method of claim 5 wherein step of receiving a task definition command further comprises accepting the task program as data in a write command from the host which follows a diagnostic command from the host computer.

7. The method of claim 5 wherein the step of signaling further comprises means for sending a request to the host computer for a diagnostic inquiry to be sent from the host computer to the disk drive.

8. The method of claim 7 wherein the step of transmitting further comprises responding to a diagnostic inquiry from the host computer by sending information on the results of the task program to the host computer.

\* \* \* \* \*